(12) United States Patent
Keshavamurthy et al.

(10) Patent No.: US 9,323,539 B2
(45) Date of Patent: Apr. 26, 2016

(54) CONSTRUCTING PERSISTENT FILE SYSTEM FROM SCATTERED PERSISTENT REGIONS

(71) Applicant: Intel Corporation, Santa Clara, CA (US)

(72) Inventors: Anil S. Keshavamurthy, Portland, OR (US); Murugasamy K. Nachimuthu, Beaverton, OR (US); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 268 days.

(21) Appl. No.: 13/928,875

(22) Filed: Jun. 27, 2013

(65) Prior Publication Data
US 2015/0006831 A1    Jan. 1, 2015

(51) Int. Cl.
*G06F 9/44*    (2006.01)
*G06F 12/02*    (2006.01)
*G06F 17/30*    (2006.01)

(52) U.S. Cl.
CPC .............. *G06F 9/44* (2013.01); *G06F 12/0238* (2013.01); *G06F 12/0246* (2013.01); *G06F 17/30* (2013.01)

(58) Field of Classification Search
None
See application file for complete search history.

(56) References Cited

U.S. PATENT DOCUMENTS

| | | | | |
|---|---|---|---|---|
| 6,167,512 A * | 12/2000 | Tran | | 713/2 |
| 2004/0243534 A1* | 12/2004 | Culter et al. | | 707/1 |
| 2006/0095649 A1* | 5/2006 | Netter | G06F | 12/0246 |
| | | | | 711/103 |
| 2007/0255891 A1* | 11/2007 | Chow et al. | | 711/103 |
| 2008/0307192 A1* | 12/2008 | Sinclair et al. | | 711/218 |
| 2010/0005267 A1* | 1/2010 | Barde | | 711/173 |
| 2011/0093726 A1* | 4/2011 | Worthington et al. | | 713/320 |
| 2012/0079174 A1* | 3/2012 | Nellans et al. | | 711/103 |
| 2012/0233472 A1* | 9/2012 | Faraboschi | G06F | 12/0246 |
| | | | | 713/190 |
| 2013/0097365 A1* | 4/2013 | Lee | G06F | 12/0246 |
| | | | | 711/103 |
| 2013/0159626 A1* | 6/2013 | Katz et al. | | 711/119 |
| 2013/0191586 A1* | 7/2013 | Yang | | 711/105 |

OTHER PUBLICATIONS

Condit et.al. "Better I/O Through Byte-Addressable, Persistent Memory" ACM 2009.*

* cited by examiner

*Primary Examiner* — Tuan Thai
*Assistant Examiner* — Tasnima Matin
(74) *Attorney, Agent, or Firm* — Alpine Technology Law Group LLC

(57) ABSTRACT

Methods and apparatus related to constructing a persistent file system from scattered persistent regions are described. In one embodiment, stored information in a storage unit corresponds to one or more persistent memory regions that are scattered amongst one or more non-volatile memory devices. The one or more persistent memory regions are byte addressable. Also, the one or more persistent memory regions are used to form a virtual contiguous region. Other embodiments are also disclosed and claimed.

25 Claims, 6 Drawing Sheets

CONSTRUCTING PERSISTENT FILE SYSTEM FROM SCATTERED PERSISTENT REGIONS

FIELD

The present disclosure generally relates to the field of electronics. More particularly, some embodiments of the invention generally relate to constructing a persistent file system from scattered persistent regions.

BACKGROUND

Generally, memory used to store data in a computing system can be volatile (to store volatile information) or non-volatile (to store persistent information). Volatile data structures stored in volatile memory are generally used for temporary or intermediate information that is required to support the functionality of a program during the run-time of the program. On the other hand, persistent data structures stored in non-volatile memory are available beyond the run-time of a program and can be reused. Moreover, new data is typically generated as volatile data first, before the user or programmer decides to make the data persistent. For example, programmers or users may cause mapping (i.e., instantiating) of volatile structures in volatile main memory that is directly accessible by a processor. Persistent data structures, on the other hand, are instantiated on non-volatile storage devices like rotating disks attached to Input/Output (I/O or IO) buses or non-volatile memory based devices like flash memory.

As processing capabilities are enhanced in processors, one concern is the speed at which memory may be accessed by a processor. For example, to process data, a processor may need to first fetch data from a memory. After completion of the data processing, the results may need to be stored in the memory. Therefore, the memory speed can have a direct effect on overall system performance.

Another important consideration is power consumption. For example, in mobile computing devices that rely on battery power, it is very important to reduce power consumption to allow for the device to operate while mobile. Power consumption is also important for non-mobile computing devices as excess power consumption may increase costs (e.g., due to additional power usage, increasing cooling requirements, etc.), shorten component life, limit locations at which a device may be used, etc.

Hard disk drives provide a relatively low-cost storage solution and are used in many computing devices to provide non-volatile storage. Disk drives however use a lot of power when compared to flash memory since a disk drive needs to spin its disks at a relatively high speed and move disk heads relative to the spinning disks to read/write data. All this physical movement generates heat and increases power consumption. To this end, some higher end mobile devices are migrating towards flash memory devices that are non-volatile.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
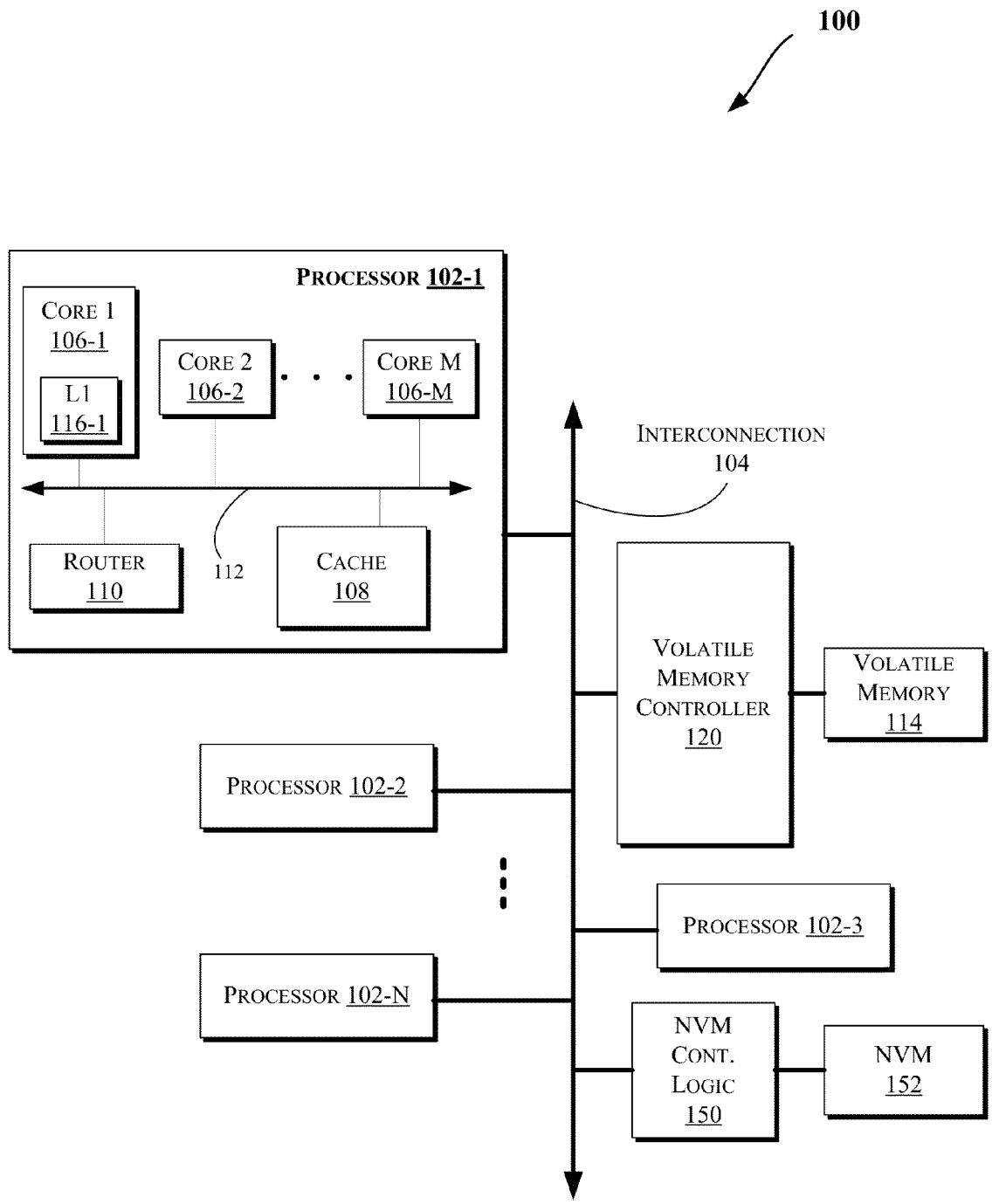
FIGS. 1, 5, 6, and 7 illustrate block diagrams of embodiments of computing systems, which may be utilized to implement various embodiments discussed herein.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

Some embodiments provide techniques for constructing a persistent file system from scattered persistent regions, e.g., on Non-Volatile Memory (NVM) devices. An embodiment provides a solution for platforms that support byte addressable persistent (i.e., non-volatile) memory (e.g., based on 3D (3-Dimentional Cross Point Memory such as Phase Change Memory (PCM) technology or a device based on any other non-volatile memory technology), allowing accessibility to the storage class memory via the memory bus. Generally, byte addressability of the NVM refers to accessibility of individual bytes of the NVM, e.g., directly by a processor or processor core (or other components of a computing system such as the components discussed with reference to FIGS. 1 and 5-7). Furthermore, accessibility of persistent memory via the memory bus may co-exist with traditional DRAM (Dynamic Random Access Memory) based volatile memory.

In various embodiments, the NVM devices discussed herein include flash memory, Spin Torque Transfer Random Access Memory (STTRAM), Resistive Random Access Memory, 3D (3-Dimensional) Cross Point Memory such as Phase Change Memory (PCM), etc.

Furthermore, the physically addressable persistent memory region(s) may have multiple segments scattered within a platform's physical address range. The order in which these persistent memory segments are exposed to the OS (Operating System), e.g., by the BIOS (Basic Input/Output System), may change from system boot to system boot due to addition and/or removal of DRAM memory and/or other configuration changes to memory in general. In order for the OS to reconstruct the persistent data stored on these scattered persistent segments, the segments themselves need to be mapped in proper and correct order by the OS. To this end, some embodiments communicate information to the OS regarding the scattered regions of persistent memory (e.g., via the BIOS) and may also help the OS to reconstruct a contiguous region from the (e.g., randomly ordered) scattered persistent regions without losing the persistent data. The OS may in turn utilize the information regarding the contiguous persistent region (i.e., no matter how these scattered persistent regions are reported to OS by the BIOS) to construct the persistent file system data. Another embodiment applies to building persistent non-volatile system data to construct memory block device.

Moreover, the memory techniques discussed herein may be provided in various computing systems (e.g., including smart phones, tablets, portable game consoles, Ultra-Mobile Personal Computers (UMPCs), etc.), such as those discussed with reference to FIGS. 1-7. More particularly, FIG. 1 illustrates a block diagram of a computing system 100, according to an embodiment of the invention. The system 100 includes one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 120, logic 150, memory controllers (such as those discussed with reference to FIGS. 5 and 6), NVM 152, or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a volatile memory 114 for faster access by the components of the processor 102. As shown in FIG. 1, the memory 114 may be in communication with the processors 102 via the interconnection 104. In an embodiment, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 1, memory 114 may be coupled to other components of system 100 through a volatile memory controller 120. System 100 also includes NVM memory controller logic 150 to couple NVM memory 152 to various components of the system 100. Memory 152 includes non-volatile memory such as flash memory, STTRAM, Resistive Random Access Memory, 3D Cross Point Memory such as PCM, etc. in some embodiments. Even though the memory controller 150 is shown to be coupled between the interconnection 104 and the memory 152, the logic 150 may be located elsewhere in system 100. For example, logic 150 (or portions of it) may be provided within one of the processors 102, controller 120, etc. in various embodiments. Moreover, logic 150 controls access to one or more NVM devices 152 (e.g., where the one or more NVM devices are provided on the same integrated circuit die in some embodiments), as discussed herein with respect to various embodiments.

Furthermore, some embodiments help reconstruct the persistent data residing on scattered persistent 3D Cross Point Memory devices (e.g., DIMMs (Dual In-line Memory Modules) by the operating system and have one or more of the following three components: (1) the BIOS describing the scattered persistent regions to OS; (2) the OS initializing the scattered regions with hidden markers and mapping them for the first time; and/or (3) the OS reconstructing a contiguous persistent region on successive reboots.

As for item (1) above (i.e., the BIOS to describing the scattered persistent regions to OS), an embodiment utilizes a platform BIOS that provides the ability to partition the (e.g., 3D Cross Point Memory based) persistent memory into volatile (e.g., with DRAM as cache, a.k.a. 2LM (two Level system main Memory)) and non-volatile (e.g., persistent memory) regions. Users who wish to have the persistent memory usage may enter the BIOS utility and specify the intended size of this persistent memory. The platform BIOS may satisfy these users' options by carving out the specified size (either contiguous or scattered region) from the installed (e.g., 3D Cross Point Memory based) persistent memory. Furthermore, during boot, the platform BIOS can describe the carved out region of persistent memory (also referred to herein as "$NVM") to the OS via Advanced Configuration and Power Interface (ACPI) tables (which may be in accordance with ACPI Specification, Revision 5.0, December 2011). Table 1 below illustrates some sample values for such an ACPI table in accordance with an embodiment. Of course, other values may be utilized depending on the implementation.

TABLE 1

| Field | Byte Length | Byte Offset | Description |
| --- | --- | --- | --- |
| ACPI Standard Header | | | |
| Header Signature | 4 | 0x0 | $NVM; signature for the $NVM region table |
| Length | 4 | 0x4 | Length, in bytes |
| Revision | 1 | 0x8 | 1 |
| Checksum | 1 | 0x9 | Entire table must sum to zero |
| OEMID | 6 | 0xA | OEM (Original Equipment Manufacturer) ID (Identifier) |
| OEM Table ID | 8 | 0x10 | manufacturer model ID |
| OEM Revision | 4 | 0x18 | OEM revision of $NVM |
| Creator ID | 4 | 0x1C | Vendor ID of the utility that created the table |
| Creator Revision | 4 | 0x20 | Revision of the utility that created the table |
| $NVM Regions | | | Repeats for Every $NVM region |
| Base address | 8 | 0x24 | 4k aligned base address of the $NVM region1 |
| Length | 8 | 0x2c | Length of the $NVM region1 |
| Flags | 2 | 0x34 | e.g., 0 = Persistent, 1 = optimized block mode, 2 = emulated block mode |
| Reserved | 2 | 0x36 | Reserved for future use |

The above $NVM region table describes an $NVM base address and the $NVM length. Based on the $NVM region Table length field at offset 4, OS can determine the number of $NVM regions described by the BIOS. Bit 0 of the flags field at offset 0x34 conveys the persistent nature of the memory. The above base address, length, and flags may be provided for each persistent memory region which indicates whether a given persistent memory region has a persistent mode, an optimized block mode, or an emulated block mode.

Regarding item (2) above (i.e., the OS initializing scattered regions with hidden markers and mapping them for the first time), the persistent memory region is used to construct a file system (such as a pmfs file system, where "pmfs" refers to a byte addressable persistent storage class memory file system). In an embodiment, creation of a file system for the first time on a persistent memory can be performed in response to a special parameter (e.g., Boolean "init=1" that may accompany or be associated with a "mount" command for the storage device) to cause mounting of the persistent file system.

One example of such a mount command may be "mount—t pmfs init=1 none/mnt/$NVM" in an embodiment. Such command line parameters (e.g., "init=1" that is passed in the mount command line) may be in turn passed to the pmfs file system registered mount function callback by the OS. Hence, some embodiments parse the command line parameters, and if the parameter passed is found to be "init=1" then the pmfs file system is constructed from the scattered persistent memory for the first time as described below.

Figure 2:
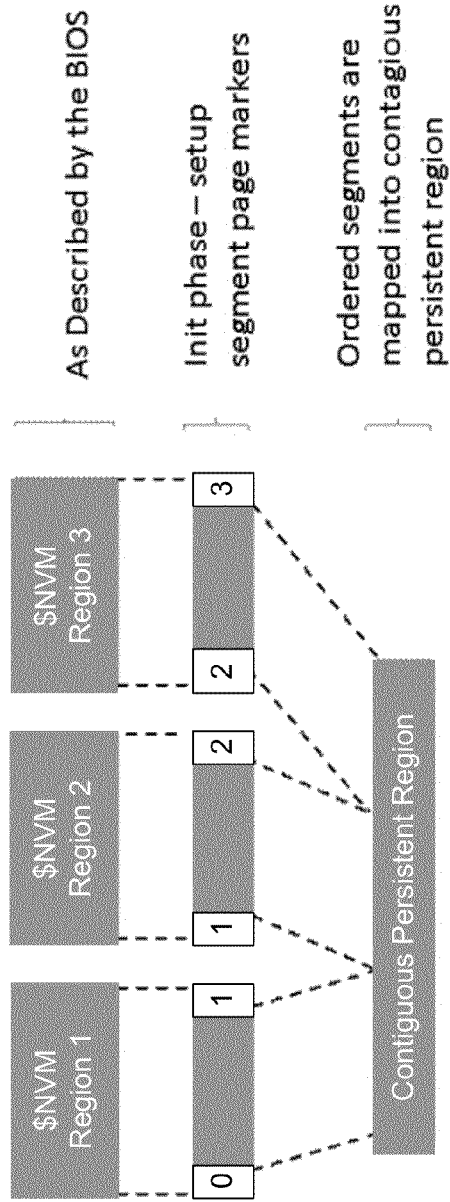
FIGS. 2-3 illustrate block diagrams of scattered memory regions, according to some embodiments.
Figure 3:
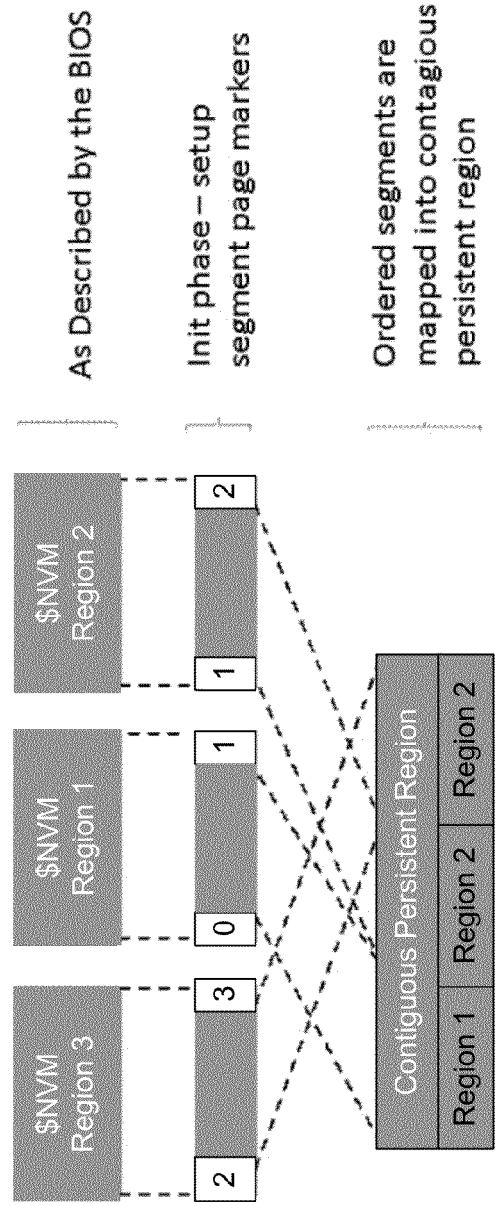

FIGS. 2-3 illustrate block diagrams of scattered memory regions, according to some embodiments. When the file system is constructed for the first time (e.g. with the "init=1" passed in the command line of mount command), the pmfs file system driver's mount function callback is called with $NVM regions as reported by the BIOS. In this callback function, for each of the reported $NVM regions, a page may be hidden at the beginning and end of the region as shown in FIG. 2. In each of the above regions, a page that is hidden at the beginning of the region (i.e., on the left side of the region) is called "SegmentPageRegionBegin" and a page that is hidden at the end of each region (i.e., on the right side of the region) is called "SegmentPageRegionEnd". For simplicity of discussion, only three $NVM persistent regions are shown with each of the regions having "SegmentPageRegionBegin" and "SegmentPageRegionEnd".

Moreover, the mount callback function of the pmfs file system will tag the "SegmentPageRegionEnd" of $NVM region 1 and the "SegmentPageRegionBegin" of $NVM region2 with the same tag, and so on. For simplicity in FIG. 2, this is marked as "1". Similarly, for all of the hidden "SegmentPageRegions{Begin|End}" pages, tagging is constructed so that this data is used currently (and in subsequent boots) to construct the ordered $NVM regions for the OS usage. This ordered $NVM region described (constructed from the tagging information minus hidden "SegmentPageRegionXXX") is then mapped into contiguous virtual memory on top of which the pmfs file system is constructed.

Regarding item (3) above (i.e., the OS reconstructing contiguous region on successive boots), once the file system is built on the persistent (e.g., 3D CROSS POINT MEMORY such as PCM) memory as explained above, it is possible for the OS to have created some files on this storage class memory. The next time OS is booted, it is expected that the file system be intact and hold all the persistent data/files that were created in the previous boot. As explained before, it is possible for BIOS to reorder these $NVM regions due to various reasons such as addition, deletion of other volatile memory, and/or change in some memory configurations. FIG. 3 shows one such re-ordered $NVM regions and shows how OS can reconstruct the contiguous persistent region.

Moreover, in FIG. 3, BIOS is describing $NVM Region3, $NVM Region1 and $NVM Region2 in order as opposed to previous boot's order of $NVM Region1, $NVM Region2, and $NVM Region3 (shown in FIG. 2). As mentioned above, a hidden marker exists at the beginning and end of each $NVM segment region called "SegmentPageRegionBegin" and "SegmentPageRegionEnd", respectively which hold the tag information that is used to construct the previous order.

In our case of persistent file systems, during mount callback of the pmfs file system, the $NVM regions are detected/determined as reported to OS by the BIOS by walking the $NVM region table. For each of the regions, "SegmentPageRegionBegin" and "SegmentPageRegionEnd" are considered and mapping the tag values are started to construct the ordered $NVM segments. Once the ordered segments are obtained, this ordered segments are mapped to form the contiguous persistent memory region which is subsequently presented to the file system.

One embodiment may include additional information in the SegmentPageRegion{Begin|End} fields. For simplicity, FIGS. 2-3 show the SegmentPageRegion{Begin|End} to include tagging values, but other information such as physical DIMM UUID (Universally Unique Identifier), row, column bank, a checksum, etc. may also be included in the SegmentPageRegion{Begin|End} fields.

In accordance with one embodiment, each of the $NVM regions include a (e.g., hidden) page at the beginning of the region ("SegmentPageRegionStart") and another (e.g., hidden) page at the end of the region ("SegmentPageRegionEnd"). During the first time construction of the persistent file system, the tagging/marker on these SegmentPageRegions are initialized such that the adjacent SegmentPage marker shares the same tag value (see, e.g., FIG. 2). During the next successive reboots, OS uses these markers/tagging to reconstruct the correct order of segments and to construct the contiguous virtual region which is then presented to file system layer for its file system consistency checks, etc.

Moreover, in some current kernel designs, one has to hide the memory from the OS via kernel command line option(s) and remember this address and use it to create a file system or a RAM disk. By contrast, some embodiments provide BIOS options and an ACPI-based method to report to OS about the persistent regions of memory and allow for a way for the OS to reorder these scattered persistent segments to render the previously stored data usable.

Figure 4:
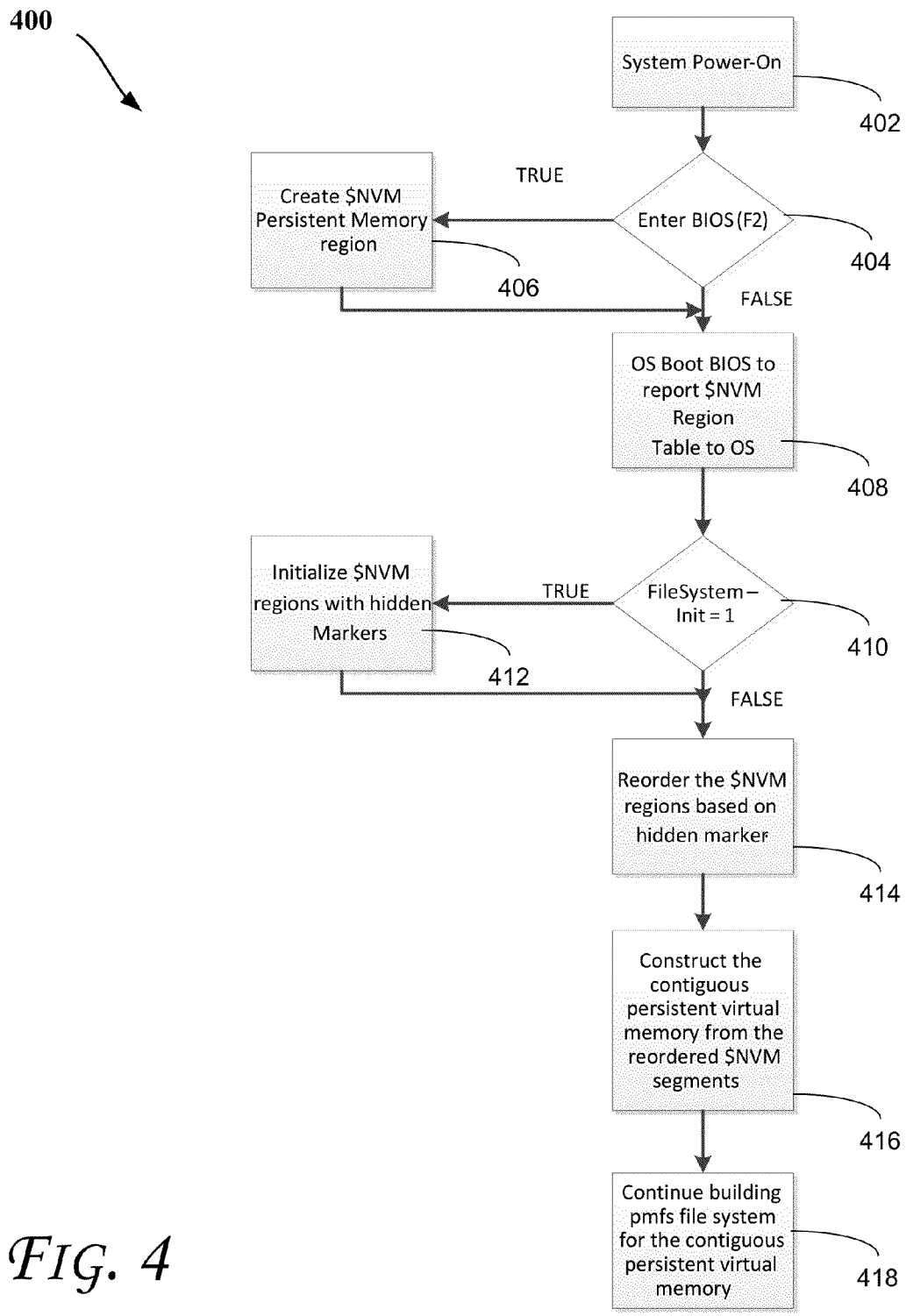
FIG. 4 illustrates a flow diagram of a method according to an embodiment.

FIG. 4 illustrates a flow diagram of a method 400 to construct a persistent file system from scattered persistent region, according to an embodiment. In various embodiments, one or more operations of method 400 can be performed by one or more components discussed with reference to the other figures.

Referring to FIG. 4, after an operation 402 (e.g., at system power-on), a user can enter the BIOS setup option/utility by pressing a special key (such as F2) at operation 404. Once the BIOS setup option is invoked, the user can create a persistent memory region at operation 406 with the desired size and save the configuration and continue to boot the OS. The BIOS in turn presents the OS with information about the $NVM region at operation 408, e.g., via the ACPI $NVM region table that describes the multiple $NVM regions detailing the desired size of persistent memory. At the start of the file system mount (e.g., if the init=1 option is passed to file system at operation 410), the file system reconstructs the tagging information for the hidden SegmentPageRegion{Begin|End} at operation 412. If the init=1 is not passed at operation 410, then the system tries to construct the correct order of the $NVM segments from the tagging information available from the hidden SegmentPageRegion{Begin|End}. Once the system correctly orders the $NVM region at operation 414, a contiguous virtual region is established using OS memory map techniques from the physically scattered persistent memory regions at operation 416. At operation 418, this virtually contiguous region of persistent memory is used for file system to present the persistent data to the OS and/or software applications.

Accordingly, the tagging information in the SegmentPageRegionBegin and SegmentPageRegionEnd fields are not only useful for constructing the ordered segments but are also helpful to know if any segments are missing, e.g., as a result of hot or erroneous removal of the persistent memory module(s).

Figure 5:
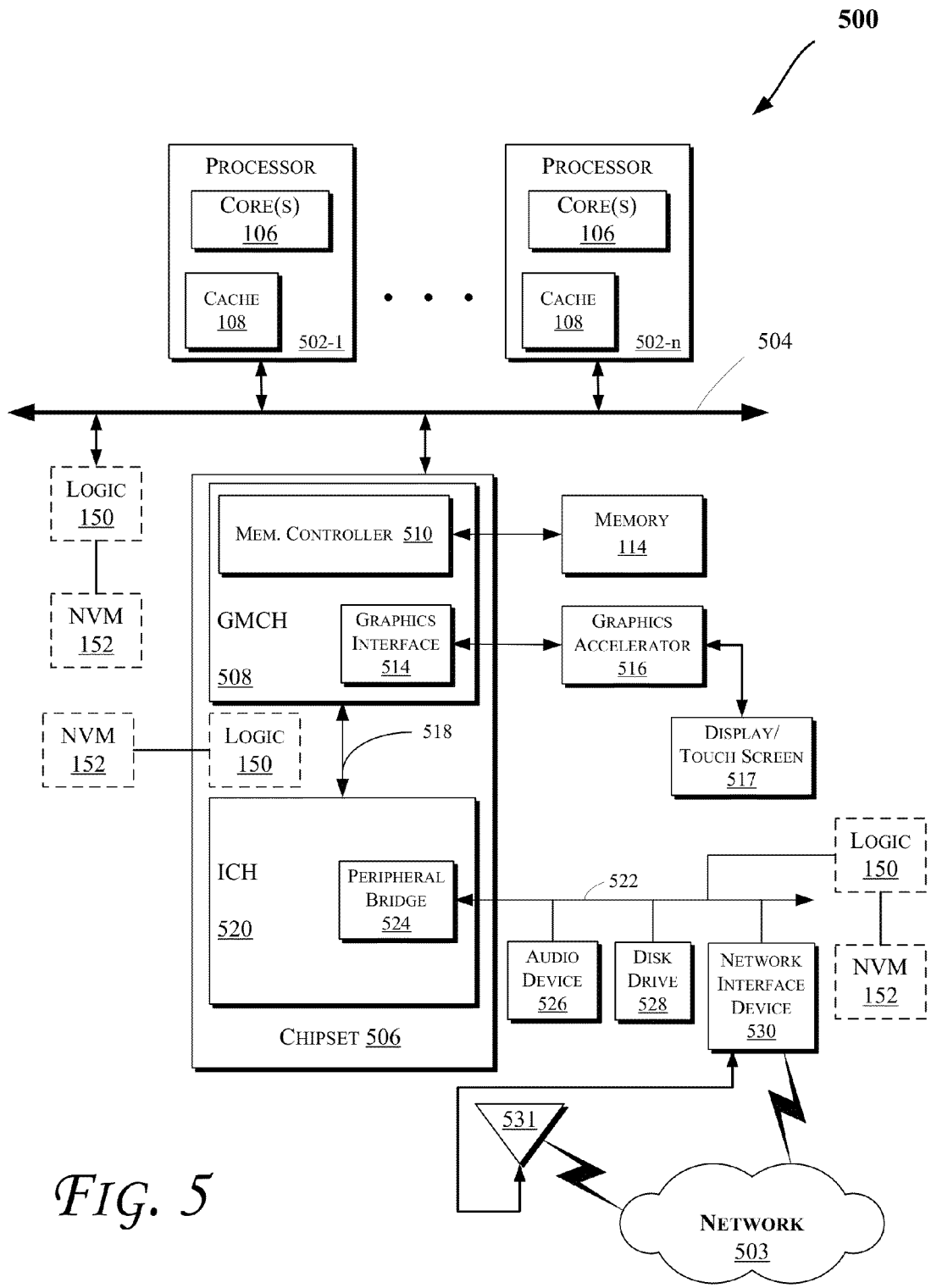

FIG. 5 illustrates a block diagram of a computing system 500 in accordance with an embodiment of the invention. The computing system 500 may include one or more central processing unit(s) (CPUs) 502 or processors that communicate via an interconnection network (or bus) 504. The processors 502 may include a general purpose processor, a network processor (that processes data communicated over a computer network 503), an application processor (such as those used in cell phones, smart phones, etc.), or other types of a processor (including a reduced instruction set computer (RISC) processor or a complex instruction set computer (CISC)). Various types of computer networks 503 may be utilized including wired (e.g., Ethernet, Gigabit, Fiber, etc.) or wireless networks (such as cellular, 3G (Third-Generation Cell-Phone Technology or 3rd Generation Wireless Format (UWCC)), 5G, Low Power Embedded (LPE), etc.). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors.

In an embodiment, one or more of the processors 502 may be the same or similar to the processors 102 of FIG. 1. For example, one or more of the processors 502 may include one or more of the cores 106 and/or cache 108. Also, the operations discussed with reference to FIGS. 1-4 may be performed by one or more components of the system 500.

A chipset 506 may also communicate with the interconnection network 504. The chipset 506 may include a graphics and memory control hub (GMCH) 508. The GMCH 508 may include a memory controller 510 (which may be the same or similar to the memory controller 120 of FIG. 1 in an embodiment) that communicates with the memory 114. System 500 may also include logic 150 (e.g., coupled to NVM 152) in various locations (such as those shown in FIG. 5 but can be in other locations within system 500 (not shown)). The memory 114 may store data, including sequences of instructions that are executed by the CPU 502, or any other device included in the computing system 500. In one embodiment of the invention, the memory 114 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk, flash, 3D Cross Point Memory (such as PCM), Resistive Random Access Memory, and STTRAM. Additional devices may communicate via the interconnection network 504, such as multiple CPUs and/or multiple system memories.

The GMCH 508 may also include a graphics interface 514 that communicates with a graphics accelerator 516. In one embodiment of the invention, the graphics interface 514 may communicate with the graphics accelerator 516 via an accelerated graphics port (AGP). In an embodiment of the invention, a display 517 (such as a flat panel display, touch screen, etc.) may communicate with the graphics interface 514 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display 517.

A hub interface 518 may allow the GMCH 508 and an input/output control hub (ICH) 520 to communicate. The ICH 520 may provide an interface to I/O devices that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503, e.g., via a wired or wireless interface). As shown, the network interface device 530 may be coupled to an antenna 531 to wirelessly (e.g., via an Institute of Electrical and Electronics Engineers (IEEE) 802.11 interface (including IEEE 802.11a/b/g/n, etc.), cellular interface, 3G, 5G, LPE, etc.) communicate with the network 503. Other devices may communicate via the bus 522. Also, various components (such as the network interface device 530) may communicate with the GMCH 508 in some embodiments of the invention. In addition, the processor 502 and the GMCH 508 may be combined to form a single chip. Furthermore, the graphics accelerator 516 may be included within the GMCH 508 in other embodiments of the invention.

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 6:
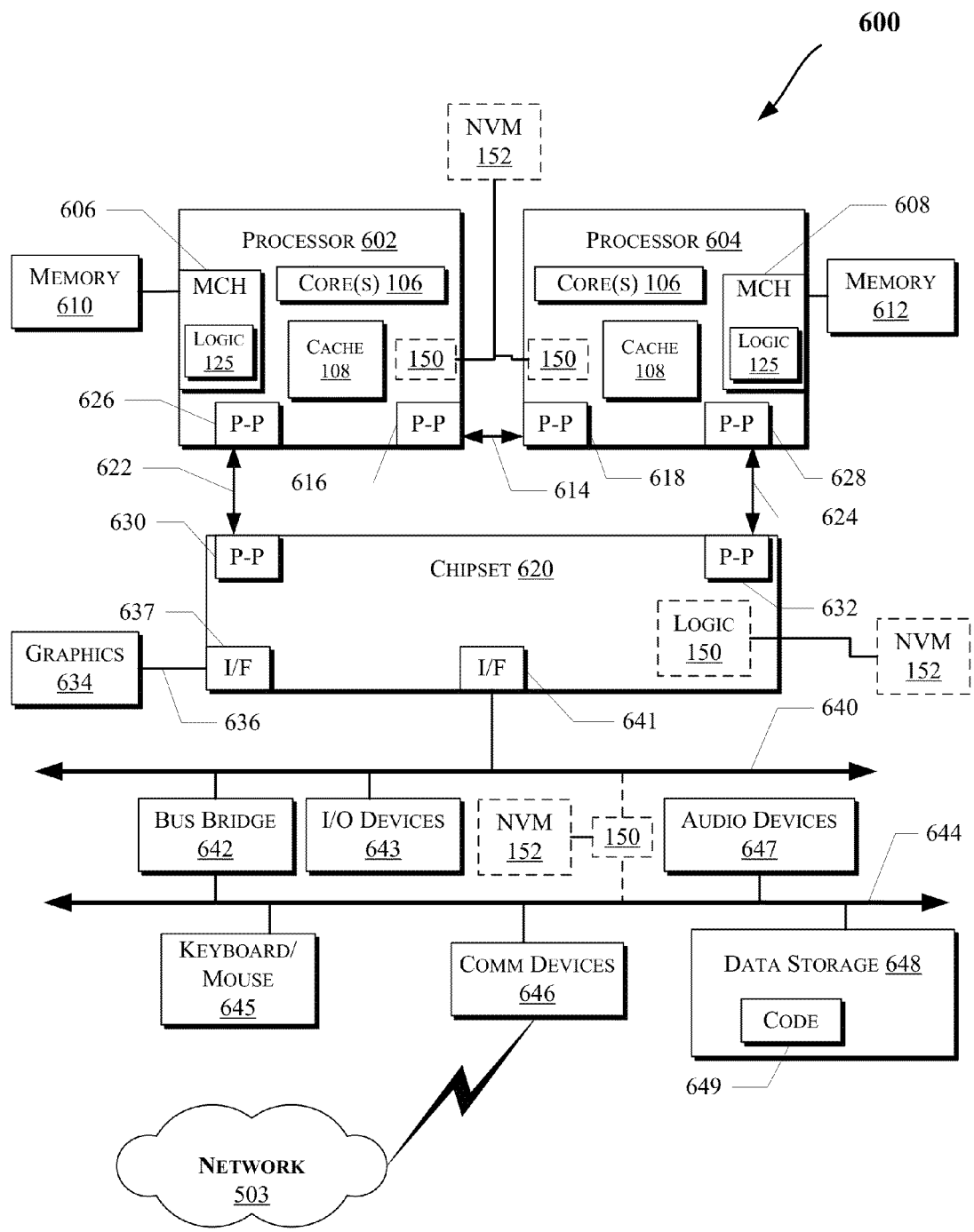

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 114 or NVM 152 of FIGS. 1 and/or 5. Also, MCH 606 and 608 may include the memory controller 120 and/or logic 150 of FIG. 1 in some embodiments.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a high-performance graphics circuit 634 via a high-performance graphics interface 636, e.g., using a PtP interface circuit 637. As discussed with reference to FIG. 5, the graphics interface 636 may be coupled to a display device (e.g., display 517) in some embodiments.

As shown in FIG. 6, one or more of the cores 106 and/or cache 108 of FIG. 1 may be located within the processors 602 and 604. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 using a PtP interface circuit 641. The bus 640 may have one or more devices that communicate with it, such as a bus bridge 642 and I/O devices 643. Via a bus 644, the bus bridge 642 may communicate with other devices such as a keyboard/mouse 645, communication devices 646 (such as modems, network interface devices, or other communication devices that may communicate with the computer network 503, as discussed with reference to network interface device 530 for example, including via antenna 531), audio I/O device, and/or a data storage device 648. The data storage device 648 may store code 649 that may be executed by the processors 602 and/or 604.

Figure 7:
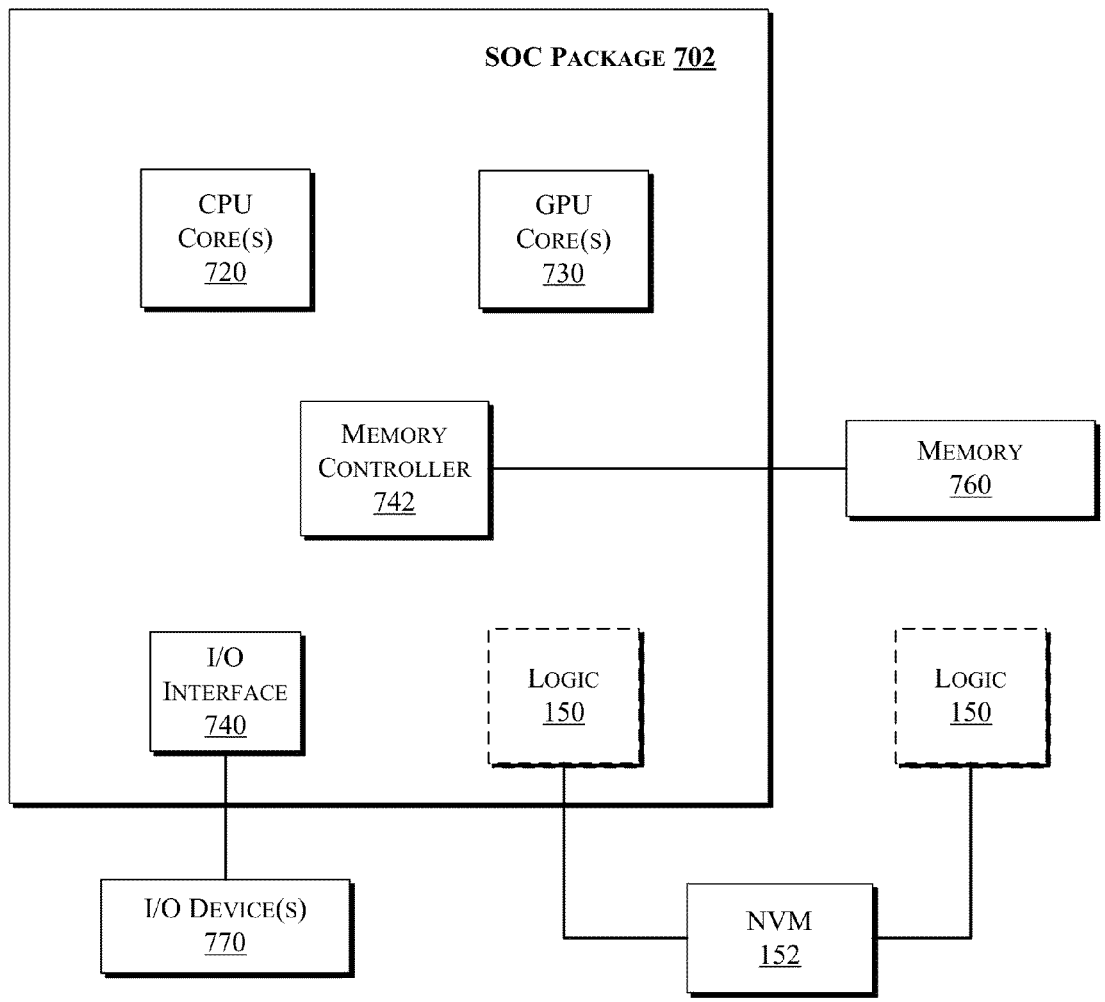

In some embodiments, one or more of the components discussed herein can be embodied as a System On Chip (SOC) device. FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 720 may include one or more other components, e.g., as discussed with reference to the other figures herein. In one embodiment, SOC package 702 (and its components) is provided on one or more Integrated Circuit (IC) die, e.g., which are packaged onto a single semiconductor device.

As illustrated in FIG. 7, SOC package 702 is coupled to a memory 760 (which may be similar to or the same as memory discussed herein with reference to the other figures) via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like. Furthermore, SOC package 702 may include/integrate the logic 150 in an embodiment. Alternatively, the logic 150 may be provided outside of the SOC package 702 (i.e., as a discrete logic).

The following examples pertain to further embodiments. Example 1 includes an apparatus comprising: a storage unit to store information corresponding to one or more persistent memory regions that are scattered amongst one or more non-volatile memory devices, wherein the one or more persistent memory regions are byte addressable and wherein the one or more persistent memory regions are to form a virtual contiguous region. Example 2 includes the apparatus of example 1, comprising logic to form the virtual contiguous region from the one or more persistent memory regions based on a plurality of tags. Example 3 includes the apparatus of example 1, wherein the storage unit is to store the information in a table in accordance with Advanced Configuration and Power Interface (ACPI). Example 4 includes the apparatus of example 1, wherein a Basic Input Output System (BIOS) is to describe the one or more persistent memory regions to an Operating System (OS) via the stored information. Example 5 includes the apparatus of example 4, comprising logic to allow the OS to initialize the one or more persistent memory regions with a plurality of tags. Example 6 includes the apparatus of example 5, comprising logic to allow the OS to reconstruct the virtual contiguous region. Example 7 includes the apparatus of example 1, wherein the stored information is to comprise one or more of: header signature, length, revision, checksum, Original Equipment Manufacturer (OEM) Identifier (ID), OEM table ID, OEM revision, creator ID, creator revision, persistent memory region base address, persistent memory region length, and one or more persistent memory region flags. Example 8 includes the apparatus of example 1, wherein the stored information is to comprise one or more persistent memory region base addresses, persistent memory region lengths, and one or more persistent memory region flags to indicate whether a persistent memory region has a persistent mode, an optimized block mode, or an emulated block mode. Example 9 includes the apparatus of example 1, wherein the one or more non-volatile memory devices are to comprise one or more of: flash memory, Phase Change Memory (PCM), 3D (3-Dimensional) Cross Point Memory, Resistive Random Access Memory, and Spin Torque Transfer Random Access Memory (STTRAM). Example 10 includes the apparatus of example 1, wherein the one or more non-volatile memory devices are on a same integrated circuit die. Example 11 includes the apparatus of example 1, wherein one or more of a controller logic, a memory, the one or more non-volatile memory devices, and a processor core are on a same integrated circuit die. Example 12 includes the apparatus of example 11, wherein a memory controller is to comprise the controller logic.

Example 13 includes method comprising: storing information in a storage unit, wherein the stored information corresponds to one or more persistent memory regions that are scattered amongst one or more non-volatile memory devices, wherein the one or more persistent memory regions are byte addressable, wherein the one or more persistent memory regions are to form a virtual contiguous region. Example 14 includes the method of example 13, further comprising forming the virtual contiguous region from the one or more persistent memory regions based on a plurality of tags. Example 15 includes the method of example 13, further comprising the storage unit storing the information in a table in accordance with Advanced Configuration and Power Interface (ACPI). Example 16 includes the method of example 13, further comprising describing the one or more persistent memory regions to an Operating System (OS) via the stored information. Example 17 includes the method of example 16, further comprising the OS causing initialization of the one or more persistent memory regions with a plurality of tags. Example 18 includes the method of example 16, further comprising the OS causing reconstruction of the virtual contiguous region. Example 19 includes the method of example 13, wherein the one or more non-volatile memory devices comprise one or more of: flash memory, Phase Change Memory (PCM), 3D Cross Point Memory, Resistive Random Access Memory, and Spin Torque Transfer Random Access Memory (STTRAM).

Example 20 includes a system comprising: one or more non-volatile memory devices; a processor to access data stored on the one or more non-volatile memory devices via controller logic; the controller logic to control access to the one or more non-volatile memory devices; a storage unit to store information corresponding to one or more persistent memory regions that are scattered amongst the one or more non-volatile memory devices, wherein the one or more persistent memory regions are byte addressable and wherein the one or more persistent memory regions are to form a virtual contiguous region. Example 21 includes the system of example 20, wherein the one or more non-volatile memory devices are to comprise one or more of: flash memory, Phase Change Memory (PCM), 3D Cross Point Memory, Resistive Random Access Memory, and Spin Torque Transfer Random Access Memory (STTRAM). Example 22 includes the system of example 20, comprising logic to form the virtual contiguous region from the one or more persistent memory regions based on a plurality of tags. Example 23 includes the system of example 20, wherein the storage unit is to store the information in a table in accordance with Advanced Configuration and Power Interface (ACPI). Example 24 includes the system of example 20, wherein a Basic Input Output System (BIOS) is to describe the one or more persistent memory regions to an Operating System (OS) via the stored information. Example 25 includes the system of example 20, wherein the stored information is to comprise one or more persistent memory region base addresses, persistent memory region lengths, and one or more persistent memory region flags to indicate whether a persistent memory region has a persistent mode, an optimized block mode, or an emulated block mode.

Example 26 includes an apparatus comprising: means for accessing one or more non-volatile memory devices; and means for storing information in a storage unit, wherein the stored information corresponds to one or more persistent memory regions that are scattered amongst one or more non-volatile memory devices, wherein the one or more persistent memory regions are byte addressable, wherein the one or more persistent memory regions are to form a virtual contiguous region. Example 27 includes the apparatus of example 26, further comprising means for forming the virtual contiguous region from the one or more persistent memory regions based on a plurality of tags. Example 28 includes the apparatus of example 26, further comprising means for storing the information in a table in accordance with Advanced Configuration and Power Interface (ACPI). Example 29 includes the apparatus of example 26, further comprising means for describing the one or more persistent memory regions to an Operating System (OS) via the stored information. Example 30 includes the apparatus of example 26, further comprising means for causing initialization of the one or more persistent memory regions with a plurality of tags. Example 31 includes the apparatus of example 26, further comprising means for causing reconstruction of the virtual contiguous region. Example 32 includes the apparatus of example 26, wherein the one or more non-volatile memory devices comprise one or more of: flash memory, Phase Change Memory (PCM), 3D Cross Point Memory, Resistive Random Access Memory, and Spin Torque Transfer Random Access Memory (STTRAM).

Example 33 includes a computer-readable medium comprising one or more instructions that when executed on a processor configure the processor to perform one or more operations of any of examples 13 to 19.

In various embodiments of the invention, the operations discussed herein, e.g., with reference to FIGS. 1-7, may be implemented as hardware (e.g., circuitry), software, firmware, microcode, or combinations thereof, which may be provided as a computer program product, e.g., including a tangible (e.g., non-transitory) machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-7.

Additionally, such tangible computer-readable media may be downloaded as a computer program product, wherein the program may be transferred from a remote computer (e.g., a server) to a requesting computer (e.g., a client) by way of data signals (such as in a carrier wave or other propagation medium) via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
a storage unit to store information corresponding to one or more persistent memory regions that are scattered amongst one or more non-volatile memory devices, wherein the one or more persistent memory regions are byte addressable and wherein the one or more persistent memory regions are to form a virtual contiguous region, wherein each of the one or more persistent memory regions is to be assigned a first tag and a second tag, wherein the first tag or the second tag of each of the one or more persistent memory regions is to be matched with the first tag or the second tag of another one of the one or more persistent memory regions to form the virtual contiguous region.

2. The apparatus of claim 1, comprising logic to form the virtual contiguous region from the one or more persistent memory regions based on a plurality of tags.

3. The apparatus of claim 1, wherein the storage unit is to store the information in a table in accordance with Advanced Configuration and Power Interface (ACPI).

4. The apparatus of claim 1, wherein a Basic Input Output System (BIOS) is to describe the one or more persistent memory regions to an Operating System (OS) via the stored information.

5. The apparatus of claim 4, comprising logic to allow the OS to initialize the one or more persistent memory regions with a plurality of tags.

6. The apparatus of claim 5, comprising logic to allow the OS to reconstruct the virtual contiguous region.

7. The apparatus of claim 1, wherein the stored information is to comprise one or more of: header signature, length, revision, checksum, Original Equipment Manufacturer (OEM) Identifier (ID), OEM table ID, OEM revision, creator ID, creator revision, persistent memory region base address, persistent memory region length, and one or more persistent memory region flags.

8. The apparatus of claim 1, wherein the stored information is to comprise one or more persistent memory region base addresses, persistent memory region lengths, and one or more persistent memory region flags.

9. The apparatus of claim 1, wherein the one or more non-volatile memory devices are to comprise one or more of: flash memory, 3D (3-Dimensional) Cross Point Memory, Resistive Random Access Memory, and Spin Torque Transfer Random Access Memory (STTRAM).

10. The apparatus of claim 1, wherein the one or more non-volatile memory devices are on a same integrated circuit die.

11. The apparatus of claim 1, wherein one or more of a controller logic, a memory, the one or more non-volatile memory devices, and a processor core are on a same integrated circuit die.

12. The apparatus of claim 11, wherein a memory controller is to comprise the controller logic.

13. A method comprising:
storing information in a storage unit, wherein the stored information corresponds to one or more persistent memory regions that are scattered amongst one or more non-volatile memory devices, wherein the one or more persistent memory regions are byte addressable, wherein the one or more persistent memory regions are to form a virtual contiguous region,
wherein each of the one or more persistent memory regions is assigned a first tag and a second tag, wherein the first tag or the second tag of each of the one or more persistent memory regions is matched with the first tag or the second tag of another one of the one or more persistent memory regions to form the virtual contiguous region.

14. The method of claim 13, further comprising forming the virtual contiguous region from the one or more persistent memory regions based on a plurality of tags.

15. The method of claim 13, further comprising the storage unit storing the information in a table in accordance with Advanced Configuration and Power Interface (ACPI).

16. The method of claim 13, further comprising describing the one or more persistent memory regions to an Operating System (OS) via the stored information.

17. The method of claim 16, further comprising the OS causing initialization of the one or more persistent memory regions with a plurality of tags.

18. The method of claim 16, further comprising the OS causing reconstruction of the virtual contiguous region.

19. The method of claim 13, wherein the one or more non-volatile memory devices comprise one or more of: flash memory, 3D Cross Point Memory, Resistive Random Access Memory, and Spin Torque Transfer Random Access Memory (STTRAM).

20. A system comprising:
one or more non-volatile memory devices;
a processor to access data stored on the one or more non-volatile memory devices via controller logic;
the controller logic to control access to the one or more non-volatile memory devices;
a storage unit to store information corresponding to one or more persistent memory regions that are scattered amongst the one or more non-volatile memory devices, wherein the one or more persistent memory regions are byte addressable and wherein the one or more persistent memory regions are to form a virtual contiguous region,
wherein each of the one or more persistent memory regions is to be assigned a first tag and a second tag, wherein the first tag or the second tag of each of the one or more persistent memory regions is to be matched with the first tag or the second tag of another one of the one or more persistent memory regions to form the virtual contiguous region.

21. The system of claim 20, wherein the one or more non-volatile memory devices are to comprise one or more of: flash memory, 3D Cross Point Memory, Resistive Random Access Memory, and Spin Torque Transfer Random Access Memory (STTRAM).

22. The system of claim 20, comprising logic to form the virtual contiguous region from the one or more persistent memory regions based on a plurality of tags.

23. The system of claim 20, wherein the storage unit is to store the information in a table in accordance with Advanced Configuration and Power Interface (ACPI).

24. The system of claim 20, wherein a Basic Input Output System (BIOS) is to describe the one or more persistent memory regions to an Operating System (OS) via the stored information.

25. The system of claim 20, wherein the stored information is to comprise one or more persistent memory region base addresses, persistent memory region lengths, and one or more persistent memory region flags.

* * * * *